US008806508B2

(12) United States Patent
Ng et al.

(10) Patent No.: US 8,806,508 B2
(45) Date of Patent: Aug. 12, 2014

(54) POS HARDWARE ABSTRACTION

(75) Inventors: Andrew Yue Hang Ng, Hong Kong (CN); Sylvester M. La Blanc, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/524,082

(22) Filed: Jun. 15, 2012

(65) Prior Publication Data

US 2012/0254897 A1    Oct. 4, 2012

Related U.S. Application Data

(63) Continuation of application No. 11/888,247, filed on Jul. 31, 2007, now Pat. No. 8,225,333.

(51) Int. Cl.
*G06F 13/00* (2006.01)
*G06Q 20/20* (2012.01)
*G07G 1/14* (2006.01)
*G07G 1/00* (2006.01)

(52) U.S. Cl.
CPC ............... *G07G 1/14* (2013.01); *G06Q 20/202* (2013.01); *G07G 1/0009* (2013.01)
USPC .......................................... 719/316; 719/328

(58) Field of Classification Search
CPC ................................ G06F 9/465; G06F 9/541
USPC .................................................. 719/316, 328
See application file for complete search history.

(56) References Cited

U.S. PATENT DOCUMENTS

| | | | |
|---|---|---|---|
| 5,612,898 A | 3/1997 | Huckins | |
| 5,787,246 A | 7/1998 | Lichtman et al. | |
| 6,763,327 B1 | 7/2004 | Songer et al. | |
| 7,130,895 B2 | 10/2006 | Zintel et al. | |
| 7,133,939 B1 | 11/2006 | Desai et al. | |
| 7,146,435 B2 | 12/2006 | Williams et al. | |
| 7,716,385 B2 * | 5/2010 | Saint-Hilaire et al. | 710/11 |
| 7,870,232 B2 | 1/2011 | Reckamp et al. | |
| 2002/0095495 A1 | 7/2002 | Otsuka et al. | |
| 2003/0046437 A1 | 3/2003 | Eytchison et al. | |
| 2005/0006468 A1 | 1/2005 | Fandel et al. | |
| 2005/0289510 A1 | 12/2005 | Illowsky et al. | |
| 2007/0256085 A1 | 11/2007 | Reckamp et al. | |
| 2008/0002702 A1 | 1/2008 | Bajic et al. | |
| 2009/0319695 A1 | 12/2009 | Saint-Hilaire et al. | |

OTHER PUBLICATIONS

Microsoft Corporation, POS for .Net Device Basic Class, pp. 1-2, 2007.
Frasker, Keir, et al. Safe Hardware Access with the Xen Virtual Machine Monitor. 2004.
Baitinger, F. et al., System Control Structure of the IBM eServer z900, V. 46, Nos. 4/5, 2002.

* cited by examiner

*Primary Examiner* — Andy Ho
(74) *Attorney, Agent, or Firm* — Damon Rieth; Jim Ross; Micky Minhas

(57) ABSTRACT

A framework for point of sale system is discussed. The framework includes an application program stored on a tangible computer medium. When executed by a computing device, the application is capable of communicating using a first protocol. The framework further includes a first point of sale hardware device externally located from the computing device and configured to communicate with the computing device using a second protocol and a device abstraction layer capable of communicating with the application program using the first protocol and the first point of sale hardware device using the second protocol to pass information between the application program and the first point of sale hardware device.

20 Claims, 4 Drawing Sheets

POS HARDWARE ABSTRACTION

CROSS-REFERENCE TO RELATED APPLICATION

The present application is a continuation of and claims priority of U.S. patent application Ser. No. 11/888,247, filed Jul. 31, 2007, now U.S. Pat. No. 8,225,333, the content of which is hereby incorporated by reference in its entirety.

BACKGROUND

A number of different classes of point of sale (POS) peripheral devices exist that are configured to communicate with electronic computing systems for the purpose of communicating information in a retail environment. A non-exhaustive list of extant classes of POS devices includes scanners, printers, magnetic ink character recognition (MICR) devices, magnetic stripe readers (MSRs), signature capture (SIG CAP) devices, cash drawers, and the like.

Software applications related to retail POS activities advantageously communicate with POS devices to complete sales events. For example, an inventory of items to be purchased is collected by scanning information displayed on a product package such as is found in a universal product code (UPC). In addition, payment information can be collected through the use of MSRs and SIG CAPs. The use of such devices results in more efficient POS experiences, better inventory control, and the like.

These different peripheral devices are configured to communicate with computing machines that execute the above mentioned software applications using a particular protocol or drive model. One type of protocol is known as OLE for POS or OPOS. Software applications that are capable, for example, of communicating with a device that employs OPOS typically has a layer that handles communication with the OPOS device. However, not all peripheral devices employ the same communication protocol. Therefore, systems with peripheral devices that do not have a common interface protocol necessarily require modifications to the software application in order to function properly. Such modifications can be costly and cumbersome to implement. What is needed, then, is a way to interface peripheral devices without requiring any modifications to any software applications that are configured to access the devices.

The discussion above is merely provided for general background information and is not intended to be used as an aid in determining the scope of the claimed subject matter.

SUMMARY

In one embodiment, a framework for point of sale system is discussed. The framework includes an application program stored on a tangible computer medium. When the application is executed by a computing device, it is capable of communicating using a first protocol. The framework further includes a first point of sale hardware device externally located from the computing device and configured to communicate with the computing device using a second protocol and a device abstraction layer capable of communicating with the application program using the first protocol and the first point of sale hardware device using the second protocol to pass information between the application program and the first point of sale hardware device.

In another embodiment, a device abstraction layer configured to communicate with at least one point of sale hardware device and an application program executed on a computing device is discussed. The device abstraction layer includes a first interface exposing an IControlObject to communicate with the application program and a second interface configured to communicate with a first point of sale hardware device.

In yet another embodiment, a method of establishing communication between a computing device having an application program executing thereon and a first remote point of sale hardware device is discussed. The method includes providing a device abstraction layer between the application program and the point of sale hardware device and using the device abstraction layer to detect the point of sale hardware device. The method further includes establishing communication between the device abstraction layer and each of the application program and the first point of sale hardware device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
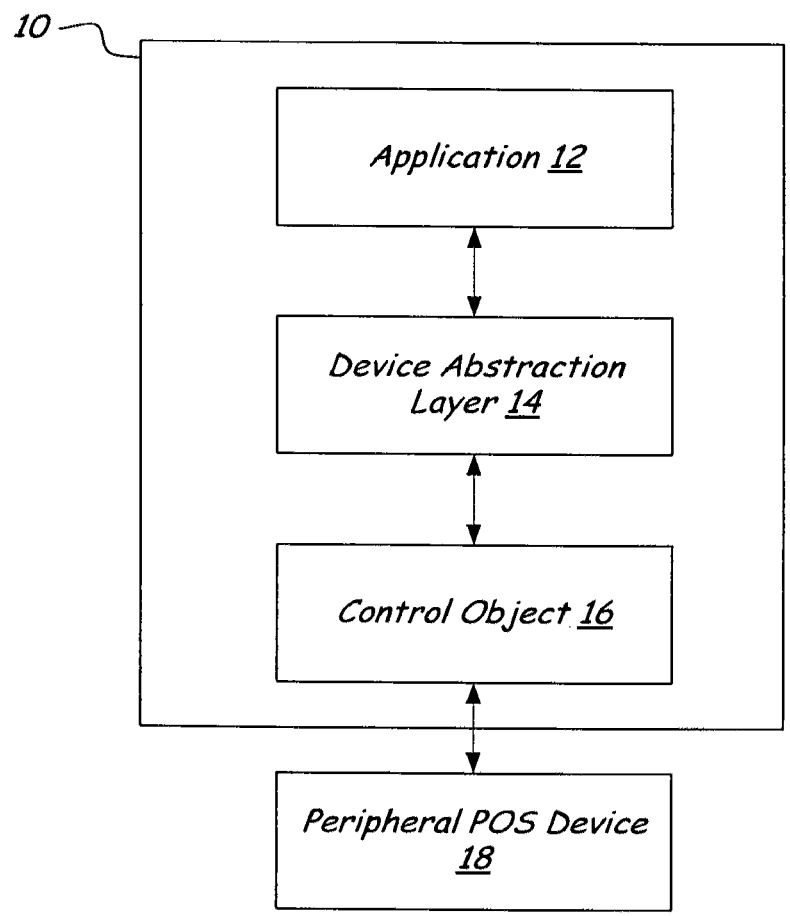
FIG. 1 is a block diagram illustrating a computing device that is configured to be interfaced with one or more peripheral point of sale devices according to one illustrative embodiment.

FIG. 1 illustrates a computing system 10 that is configured to be interfaced with one or more peripheral point of sale (POS) devices 18 (only one is represented in FIG. 1) according to one illustrative embodiment. Computing device 10 includes a software application 12, which, when executed, is capable of sending and receiving information to and from the peripheral POS devices 18 as is necessary based upon the particular application that the peripheral POS device 18 performs. The software application 12 can be written in any language and its implementation is independent of the peripheral devices 18. The computing system 10 also illustratively includes a device abstraction layer 14, which is accessible by software application 12.

The device abstraction layer 14 provides a unified communication interface between the software application 12 and the peripheral POS devices 20. The device abstraction layer 14 is configured to interface with any number of control objects 16 to exchange information between any one of the peripheral devices 18 and the software application 12. The device abstraction layer 14 provides a unified interface to the software application 12, allowing the computing system 10 to communicate with each of the peripheral POS devices 18. Regardless of the communication protocol employed by the peripheral POS devices 18, the device abstraction layer 14 provides a consistent interface protocol to the software application 12. That is, the device abstraction layer 14 provides a consistent interface protocol to the software application regardless of the underlying protocol (e.g., OPOS, POS.NET, etc) employed for communicating with a particular peripheral device 18.

Figure 2:
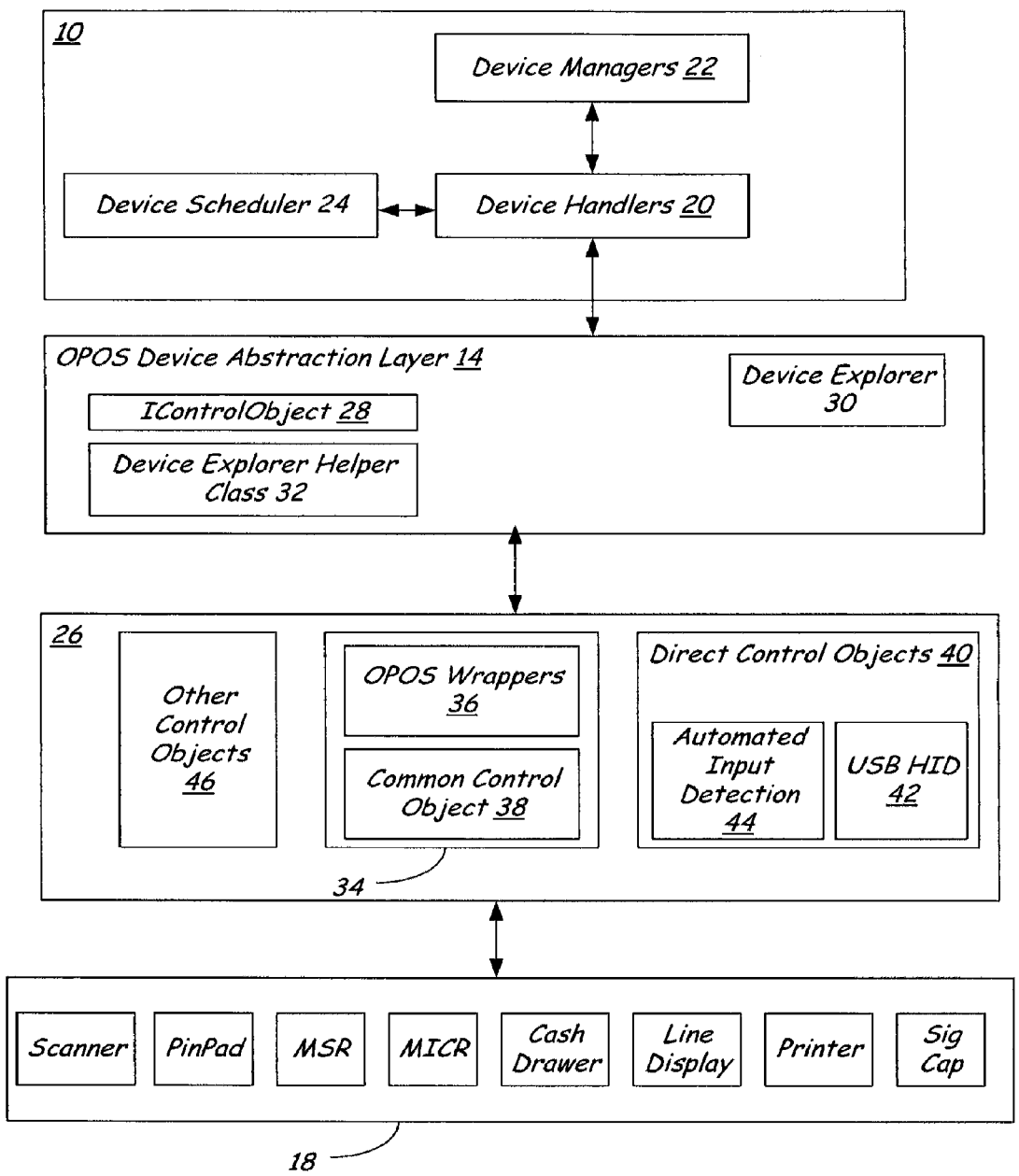
FIG. 2 is a block diagram that illustrates a hardware abstraction layer that provides a unified interface between the computing device of FIG. 1 and point of sale devices.

FIG. 2 illustrates a more detailed block diagram of system 10 including a device abstraction layer 14 for providing a unified interface for a software application 12 that communicates with peripheral POS devices 18 according to one illustrative embodiment. Software application 12 illustratively includes one or more device handlers 20, which are configured to interface the device abstraction layer. In one embodiment, system 10 includes a single device handler 20 for each category of peripheral POS devices 18 with which the application 12 is configured to communicate. A category refers to a type of device. For example, one type of device that can be interfaced with system 10 is a scanner. While there may be many different types of scanners and/or multiple scanners connected to system 10, a single device handler 20 is configured to communicate with each scanner. Because, as is mentioned above and will be discussed in more detail below, the device abstraction layer 14 provides a unified interface to the software application 12, the device handler 20 handles communication with each peripheral POS device 18 in its class in the same way. FIG. 2 provides several different examples of POS devices, including scanners, pin pads, MSRs, MICRs, Cash Drawers, Line Displays, Printers and Sig Caps. This is not meant to be an exhaustive list of devices, but a list of examples of the type of devices that can be used in POS applications.

Application 12 also illustratively includes at least one device manager 22 and a device scheduler 24. The device scheduler 24 illustratively schedules communication with peripheral POS devices 18 by providing access information related to control objects 26. The control objects 26, described in more detail below, control the peripheral POS devices 18. Each device manager 22 interfaces one or more device handlers 20.

As discussed above, the device abstraction layer 14 provides a consistent interface with the device handlers 20, regardless of the peripheral devices 18 that are attached to system 10. In one illustrative embodiment, the device abstraction layer 14 exposes an IControlObject 28 to device handlers 20. IControlObject 28 illustratively provides a single communication protocol device handlers 20. As an example, IControlObject 28 provides communication information consistent with the OLE POS or OPOS protocol for communicating with peripheral POS devices 18. Thus, when the device handlers 20 access IControlObject 28, all communication with the device handlers 20 mimics the OPOS standard. It should be appreciated that the OPOS standard is just one example of a communication protocol that can be used between the device handlers 20 and the device abstraction layer 14. Any other communication protocol can be used without departing from the spirit and scope of the discussion.

The device abstraction layer 14 also illustratively includes a device explorer 30. The device explorer 30 includes information about available POS devices. The device abstraction layer 14 exposes a DeviceExplorer helper class 32 to control objects 26, which illustratively provides methods for discovering and returning information about available devices as arrays of devices within the device explorer 30. Each control object 26 is responsible for discovering available devices of its own class. Information about such devices, including devices that have been previously registered to the control objects 26 via the DeviceExplorer helper class 32. In addition, information about devices discovered by control objects 26 is illustratively provided to the device explorer 30 via the DeviceExplorer helper class 32.

As discussed above, the device abstraction layer 14 is also illustratively configured to communicate with one or more control objects 26. The control objects 26 provide a control for the peripheral POS devices 18. In one illustrative embodiment an instance of control object 26 is provided for each of the peripheral POS devices 18. Each control object 26 is configured to communicate using a given protocol to send and/or receive information from and to the peripheral POS device 18.

Device abstraction layer 14 is illustratively configured to interface with a number of different types of One type of control object is illustratively an OPOS control object 34. The OPOS control object 34 is a standardized control object that includes a wrapper layer 36, which interacts with a common control object 38. The common control object 38 can be any common control object that is OPOS compatible and is capable of communicating with an OPOS compatible POS device.

Another type of control object that is capable of interacting with the device abstraction layer 14 is a direct control object 40. The direct control object 40 is illustratively capable of communicating directly with POS devices 14 without utilizing an OPOS control object 34. The direct control object 40 illustratively communicates directly with the POS device, bypassing the common control objects. The direct control object 40 thus allows the software application 12 to interact with POS devices that are not configured to operate under the OPOS standard. The direct control object 40 provides a system API, which is configured to talk directly with a particular POS device.

In one illustrative embodiment the direct control object 40 includes a universal serial bus human interface device (USB HID) class 42 that is exposed to the POS device 18 to provide a communication link to the POS device 18. In addition, the direct control object 40 includes automated input detection 44, which detects the presence of a POS device 18 that is configured to communicate with the direct control object 40. In one illustrative embodiment, each category of supported devices (scanners, cash drawers, MSRs and the like) will have its own USB HID class 42. The device abstraction layer 14 is capable of communicating with the direct control object 40 and provide an OPOS compatible interface to the proper device handler 20 through the IControlObject 28.

The device abstraction layer 14 is thus capable of communicating with a control object 26 that has the same standard protocol as the device handler 20. In addition, the device abstraction layer 14 is capable of communicating directly with a peripheral POS device 18 has no standard protocol. In one illustrative embodiment the device abstraction layer 14 is also capable of communicating with a peripheral POS device 18 that communicates with a standardized protocol other than the one used by device handler 20. Control object 46 utilizes a standardized protocol and is conceptually similar to the OPOS control object 34, except that it employs a different communication standard. It should be appreciated that although different types of control objects are described, any one particular implementation can have any number of control objects without limitation. Further, specific implementations need not have any one particular type of control object.

Each control object component is illustratively responsible for discovering available POS device of its own class. The device abstraction layer 14 includes a device explorer that has a registry of all available types of devices that can be, for example, attached to an OPOS control object 34. Direct control devices, that is, devices that are directly controlled by a direct control object 40, are illustratively detected by the automated input detection device 44.

Figure 3:
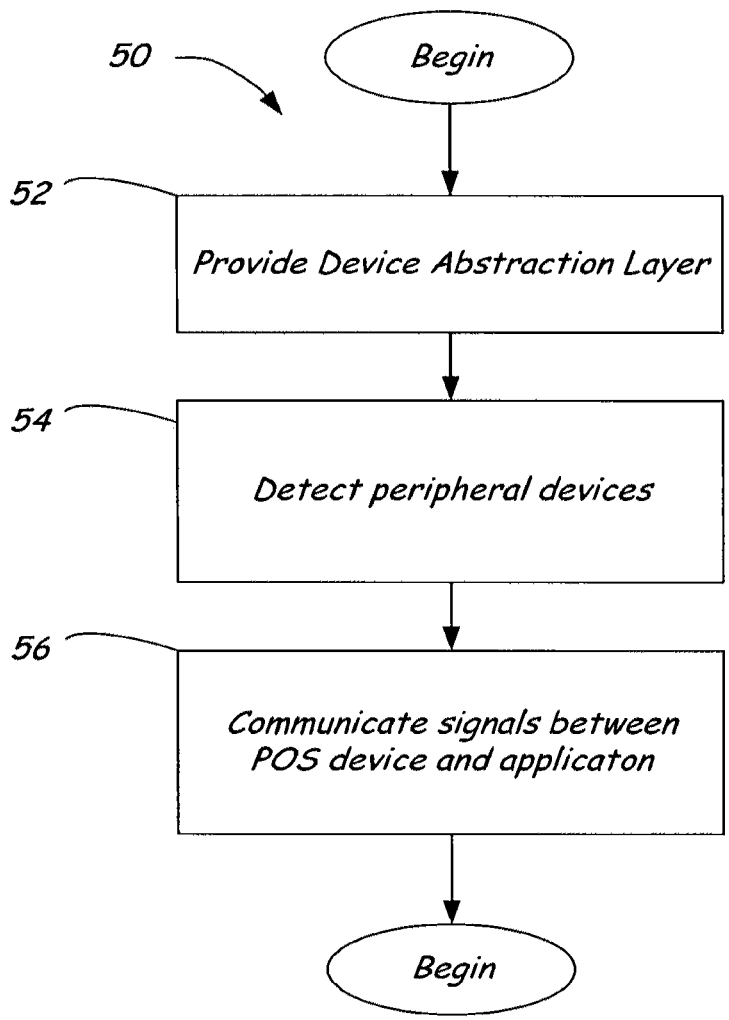
FIG. 3 is a flow diagram illustrating a method of communicating with peripheral POS devices according to one illustrative embodiment.

FIG. 3 illustrates a method 50 of communicating with peripheral POS devices according to one illustrative embodiment. The method 50 includes providing a device abstraction layer 14 (as shown in FIG. 2) between one or more device handlers 20 and instances of control objects that are each in communication with a peripheral POS device 18 as is represented by block 52. The device abstraction layer 14 is configured to communicate with a variety of control objects, including OPOS control objects 34, direct control objects 40, and other control objects 46 that adhere to standards other than OPOS.

The method further includes detecting peripheral POS devices 18 as is represented by block 54. The device abstraction layer illustratively exposes an IDeviceFactory object 48, which every control object must implement. Detection can be achieved by scanning a registry of available devices. Alternatively, in the case where a device is directly controlled by a direct object control, devices can be detected by calling system HID APIs. Once a peripheral POS device 18 is detected, an instance of the proper control object is created by the IDeviceFactory object 48 by polling the registered factories until the proper one is found. Once the POS device 18 is detected, signals are communicated between the POS device 18 and the application software 12. This is represented by block 56.

The systems and methods discussed above provide important advantages. By providing a device abstraction layer that is capable of interfacing with POS devices having a variety of different protocols and can provide a unified interface to applications, a variety of POS devices can be used with different software applications without requiring modification of the applications to make them compatible with the POS devices. Furthermore, a larger universe of POS devices can be used with software applications that were not previously available for use.

Figure 4:
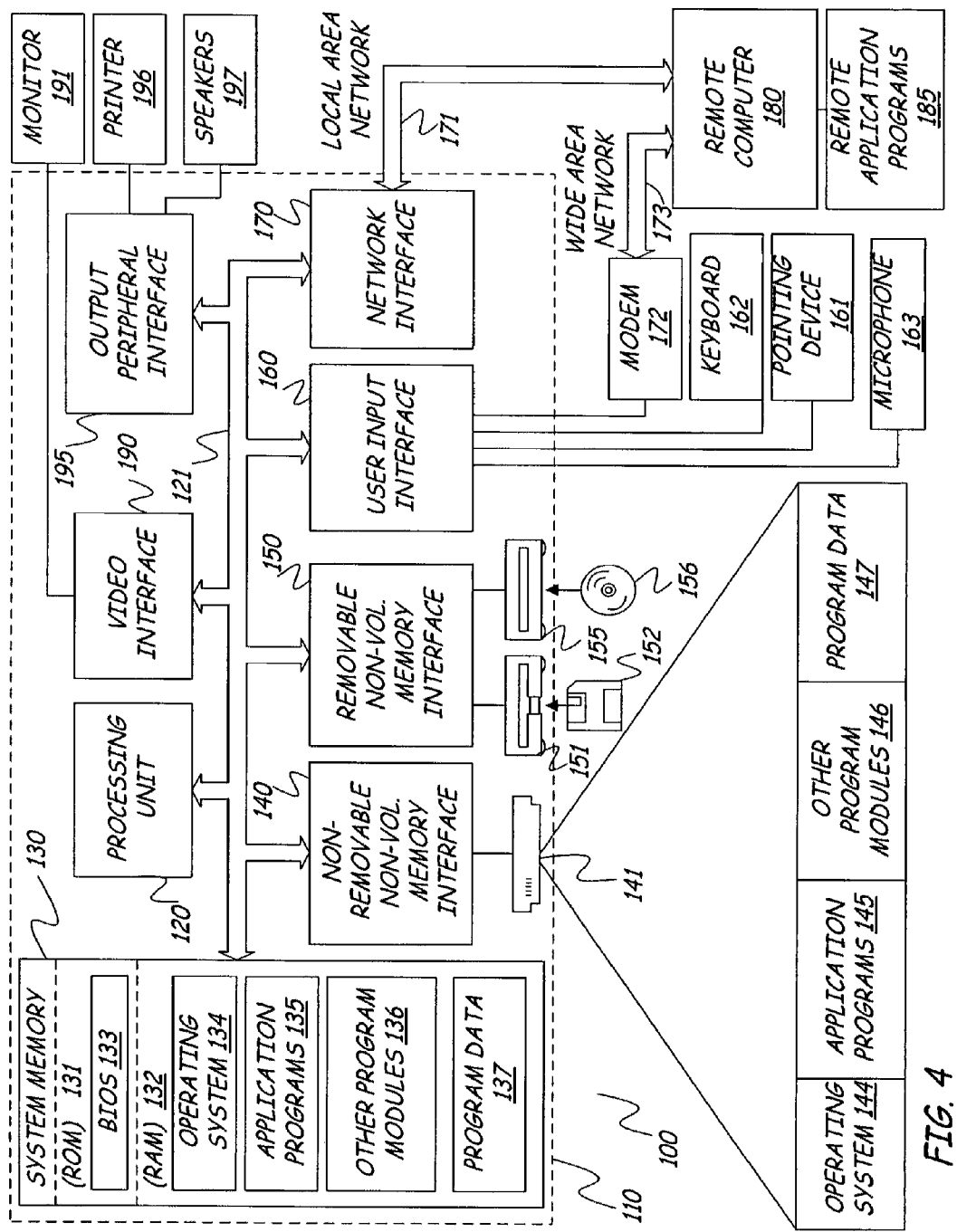
FIG. 4 is a block diagram of one computing environment in which some embodiments may be practiced.

FIG. 4 illustrates an example of a suitable computing system environment 100 on which embodiments may be implemented. The computing system environment 100 is only one example of a suitable computing environment and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 4, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 4 illustrates operating system 134, application programs 135, other program modules 136, and program data 137.

The computer 110 may also include other removable/non-removable volatile/nonvolatile computer storage media. By way of example only, FIG. 4 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 4, provide storage of computer readable instructions, data structures, program modules and other data for the computer 110. In FIG. 4, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 4 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 4 illustrates remote application programs 185 as residing on remote computer 180. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device abstraction layer that is part of a framework for a point of sale system, the device abstraction layer utilizing multiple different communication protocols to distribute information through multiple separate and distinct communication interfaces, wherein the device abstraction layer utilizes a first communication protocol to communicate across a device handler interface and a second communication protocol to communicate across a control object interface, the first communication protocol being different than the second communication protocol.

2. The device abstraction layer of claim 1, wherein the device abstraction layer utilizes a different one of the different communication protocols to distribute information through the communication interfaces to each of a plurality of different components of the point of sale system.

3. The device abstraction layer of claim 1, wherein the device abstraction layer comprises the device handler interface.

4. The device abstraction layer of claim 1, wherein the device abstraction layer comprises the control object interface.

5. The device abstraction layer of claim 1, wherein the device abstraction layer comprises the device handler interface and the control object interface.

6. The device abstraction layer of claim 1, wherein the device abstraction layer further comprises a second control object interface, the device abstraction layer utilizing a third communication protocol to communicate across the second control object interface, the first, second and third communication protocols all being different communication protocols.

7. A computer implemented method of establishing communication in a point of sale system, comprising:
receiving a first communication by way of a first control object interface in the point of sale system utilizing a first communication protocol; and
communicating an indication of the first communication through one or more device handler interfaces in the point of sale system utilizing a second communication protocol, the second communication protocol being different than the first communication protocol.

8. The method of claim 7, further comprising:
receiving a second communication by way of a second control object interface; and
communicating an indication of the second communication through said one or more device handler interfaces.

9. The method of claim 8, wherein the first and second communications are each consistent with a communication with a different type of control object.

10. The method of claim 8, wherein the first and second communications are each formatted in accordance with a different protocol.

11. The method of claim 8, wherein the first and second communications are each consistent with a communication originating from a different type of control object.

12. The method of claim 8, wherein the first and second communications are each consistent with a different control object protocol.

13. The method of claim 8, wherein the first and second communications are each consistent with a different type of point of sale device.

14. The method of claim 8, wherein the first and second communications are each consistent with a communication originating from a different type of point of sale device.

15. The method of claim 7, wherein the first control object interface and the one or more device handler interfaces comprise multiple separate and distinct communication interfaces.

16. A point of sale system comprising:
   a control object interface that communicates with a point of sale device using a first communication protocol;
   a device handler interface that communicates with an application program using a second communication protocol, the second communication protocol being different than the first communication protocol; and
   a communication facilitation component that facilitates communication between the point of sale device and the application program using the control object interface and the device handler interface.

17. The point of sale system of claim 16, and further comprising a second control object interface that communicates with a second point of sale device.

18. The point of sale system of claim 17, wherein the second control object interface communicates with the second point of sale device using a third communication protocol, the first, second and third communication protocols all being different communication protocols.

19. The point of sale system of claim 17, wherein the first and second point of sales devices are of different device types.

20. The point of sale system of claim 16, wherein the control object interface and the device handler interface comprise separate and distinct communication interfaces.

* * * * *